(12) United States Patent
Achor et al.

(10) Patent No.: US 8,528,526 B2
(45) Date of Patent: Sep. 10, 2013

(54) SNAP ASSEMBLY DECOUPLED FLOAT VAPOR VENT APPARATUS

(75) Inventors: Kyle Achor, Monticello, IN (US); Jerry Hayes, Kokomo, IN (US); Michael Richards, Kokomo, IN (US)

(73) Assignee: Federal-Mogul Corporation, Southfield, MI (US)

( * ) Notice: Subject to any disclaimer, the term of this patent is extended or adjusted under 35 U.S.C. 154(b) by 712 days.

(21) Appl. No.: 12/630,538

(22) Filed: Dec. 3, 2009

(65) Prior Publication Data

US 2011/0132469 A1 Jun. 9, 2011

(51) Int. Cl.
*F02M 37/20* (2006.01)
*B01D 53/00* (2006.01)
*B60K 15/035* (2006.01)
*F16K 24/04* (2006.01)

(52) U.S. Cl.
USPC .......................................... 123/518; 137/202

(58) Field of Classification Search
USPC ................. 123/516, 518, 572; 137/202, 587, 137/588
See application file for complete search history.

(56) References Cited

U.S. PATENT DOCUMENTS

| | | | |
|---|---|---|---|
| 1,384,450 A | 7/1921 | Gheeson | |
| 2,202,993 A | 6/1940 | Mollberg | |
| 2,493,474 A * | 1/1950 | Breese | 431/64 |
| 3,263,975 A | 8/1966 | Wu | |
| 3,306,314 A * | 2/1967 | Judsen | 137/202 |
| 3,583,418 A | 6/1971 | Marioneaux | |
| 4,299,248 A * | 11/1981 | Becker et al. | 137/202 |
| 4,562,859 A * | 1/1986 | Shames et al. | 137/414 |
| 5,067,517 A * | 11/1991 | Ting-Chih et al. | 137/426 |
| 5,072,751 A * | 12/1991 | Lin | 137/429 |
| 5,313,977 A * | 5/1994 | Bergsma et al. | 137/43 |
| 5,592,963 A | 1/1997 | Bucci et al. | |
| 5,860,458 A | 1/1999 | Benjey et al. | |
| 5,934,881 A * | 8/1999 | Yumoto | 417/133 |
| 5,988,201 A * | 11/1999 | Lebkuchner et al. | 137/202 |

(Continued)

FOREIGN PATENT DOCUMENTS

| | | |
|---|---|---|
| EP | 0336788 A1 | 10/1989 |
| GB | 2042087 A * | 9/1980 |

(Continued)

OTHER PUBLICATIONS

International Search Report PCT/US2010/057182 received Aug. 6, 2012.

(Continued)

*Primary Examiner* — Stephen K Cronin
*Assistant Examiner* — David Hamaoui
(74) *Attorney, Agent, or Firm* — Robert L. Stearns; Dickinson Wright, PLLC

(57) ABSTRACT

This invention relates generally to a vapor vent system for an internal combustion engine such as an outboard marine fuel injected engine. The vapor vent system includes a snap assembly decoupled float vapor vent in order to vent vapors from the vapor separator. The snap assembly design reduces costs, vibration and assembly requirements.

6 Claims, 4 Drawing Sheets

(56) References Cited

U.S. PATENT DOCUMENTS

| | | | | |
|---|---|---|---|---|
| 5,992,445 | A | * | 11/1999 | Pagani ................ 137/599.01 |
| 6,244,829 | B1 | * | 6/2001 | Yumoto .................... 417/133 |
| 6,311,675 | B2 | | 11/2001 | Crary et al. |
| 6,422,207 | B1 | * | 7/2002 | Kolb et al. ................ 123/461 |
| 6,422,255 | B1 | | 7/2002 | Hartke et al. |
| 6,848,463 | B2 | * | 2/2005 | Johansen ................ 137/202 |
| 7,559,337 | B2 | * | 7/2009 | Han ........................ 137/445 |
| 2004/0007262 | A1 | | 1/2004 | Hattori |
| 2007/0101974 | A1 | * | 5/2007 | Achor ...................... 123/516 |
| 2009/0088710 | A1 | * | 4/2009 | Hoffman et al. .......... 604/323 |

FOREIGN PATENT DOCUMENTS

| | | |
|---|---|---|
| JP | 59160062 A | 9/1984 |
| JP | 63080053 A | 4/1988 |
| WO | 2007047276 A2 | 4/2007 |

OTHER PUBLICATIONS

International Preliminary Report on Patentability for PCT/US10/57182 mailed on Nov. 20, 2012.

* cited by examiner

SNAP ASSEMBLY DECOUPLED FLOAT VAPOR VENT APPARATUS

BACKGROUND OF THE INVENTION

1. Technical Field

This invention relates generally to internal combustion engines, and more particularly to vapor vent systems for outboard marine fuel injected engines vent systems have a snap assembly decoupled float vapor vent.

2. Related Art

It is a long recognized problem in the internal combustion engine art that heat build-up of an engine can adversely effect the fuel supply system of the engine thereby causing the fuel to vaporize before it is introduced into the engine's combustion chambers. This condition, commonly referred to as vapor lock, can not only have a damaging effect upon engine components but can result in poor engine performance, overheating and interrupted engine operation. Fuel vapor is particularly disadvantageous in fuel injected engines. Typically, in fuel injection engines, fuel is introduced into a fuel rail by a high pressure fuel pump before it is injected into the combustion chambers by the fuel injectors. The fuel rail is typically heated to relatively high temperatures due to engine combustion heat, and the heated fuel is returned back to the fuel system during periods of low engine use such as idling and start and stop operation.

Usually, the heated fuel from the fuel rail is returned to a vapor separator where any fuel vapor created by the heated fuel is condensed back to liquid fuel before the fuel is reintroduced into the high pressure pump and fuel rail. Such vapor separators heretofore known to the art have used some form of coolant passing through the separator to cool the heated fuel and condense any fuel vapor back into liquid fuel. In most outboard Marine applications, for example, the liquid coolant is supplied from the operating environment and lake or sea water is circulated through the engine for cooling. However, because such water may have contaminants such as weeds, flotsam, or small biological life forms floating in the water, there is a risk that the engine cooling system and vapor separator may become clogged with debris and contaminants. An additional disadvantage of prior art vapor separators is that they can be expensive to manufacturer because of the intricacy of the component parts and long assembly time. Thus, it would be a desirable advanced in the art to have a vapor separator which is relatively easy to fabricate and which reduces the potentiality for clogging with contaminants.

One way to avoid fuel vapor from being directed to the fuel injectors is described in U.S. Pat. No. 6,857,419. Fuel vapor that is not condensed during cooling of the engine escapes from the chamber through a float needle valve at the top of the chamber. A pressure relief valve is provided at the top of the chamber to allow the vapor to escape when a predetermined internal pressure is reached, as depicted in FIG. 1. FIG. 1 shows a top wall assembly of a vapor separator in accordance with the prior art. A vapor passage 246 which terminates at vapor outlet 248 is formed through top wall assembly 232. Positioned at the lower end of vapor passageway 246 is needle valve assembly 250 which comprises a needle valve plunger 252 and a needle valve seat 254. A float assembly 256 is mounted to needle valve assembly 250 and comprises a support arm 258 and a float 260 attached to one end of float arm 262. The other end of float arm 262 is pivotally mounted to support arm 258 by a pivot pin 264 so that float 260 can pivot up and down. Needle valve plunger 252 is mounted on float arm 262 so that when float 260 is pivoted upwardly needle valve plunger seats against needle valve seat 254 sealing the needle valve. However, when float 260 pivots downwardly, needle valve plunger disengages needle valve seat 254 opening the valve and allowing vapor and air in the chamber to pass through the needle valve into vapor passageway 246 and out vapor outlet 248.

Referring to FIG. 2, a closed biased vent valve is used to separate vapor and/or air from a liquid in an enclosed chamber. The closed biased vent valve 210 is operated by a float 272 which is installed in the fuel chamber 270 of the fuel vapor separator 230 and has an upwardly extending float arm 268 that pivots the lever arm 214 against the force of a spring. Specifically, the upwardly float arm 268 and the lever arm 214 have hooks 269 and 219, respectively. When the fuel vapor separator 230 is filled with fuel to a designated fill level with a consequent upward movement of the float 272, the hook 269 and the hook 219 decouple from one another. As a result, the closed biased vent valve 10 remains in its closed position. Conversely, when the fuel vapor separator 230 is empty, or the fluid level in the enclosed fuel chamber 270 is depleted due to the accumulation of vaporized fuel in the enclosed fuel chamber 270, the float 272 drops below the designated level in the enclosed fuel chamber 270. During this movement, the hook 269 and the hook 219 couple with one another such that the valve 210 is placed in its open position to release vaporized fuel from the fuel vapor separator 230.

SUMMARY OF THE INVENTION

In accordance with one embodiment of the invention, a vapor vent assembly includes a hinge pin bracket with an elongate float guide member adjacent one end and a spring retention member adjacent an opposite end with a through opening and a pair of laterally spaced support arms having snap retention features between the ends; a float slidably disposed on the float guide member; a spring having opposite ends with one end being retained by the spring retention member on the hinge pin bracket; a valve needle; and a float bracket having a spring retention member adjacent one end configured to retain another end of the spring and a float retention member adjacent an opposite end configured to retain the float in an assembled state and to operably support the valve needle for opening and closing the through passage and having a locking member extending transversely between the spring retention member and the float retention member, the locking member being configured for locked, snapping engagement with the snap retention features on the hinge pin bracket to maintain the assembly in an assembled state.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 2:
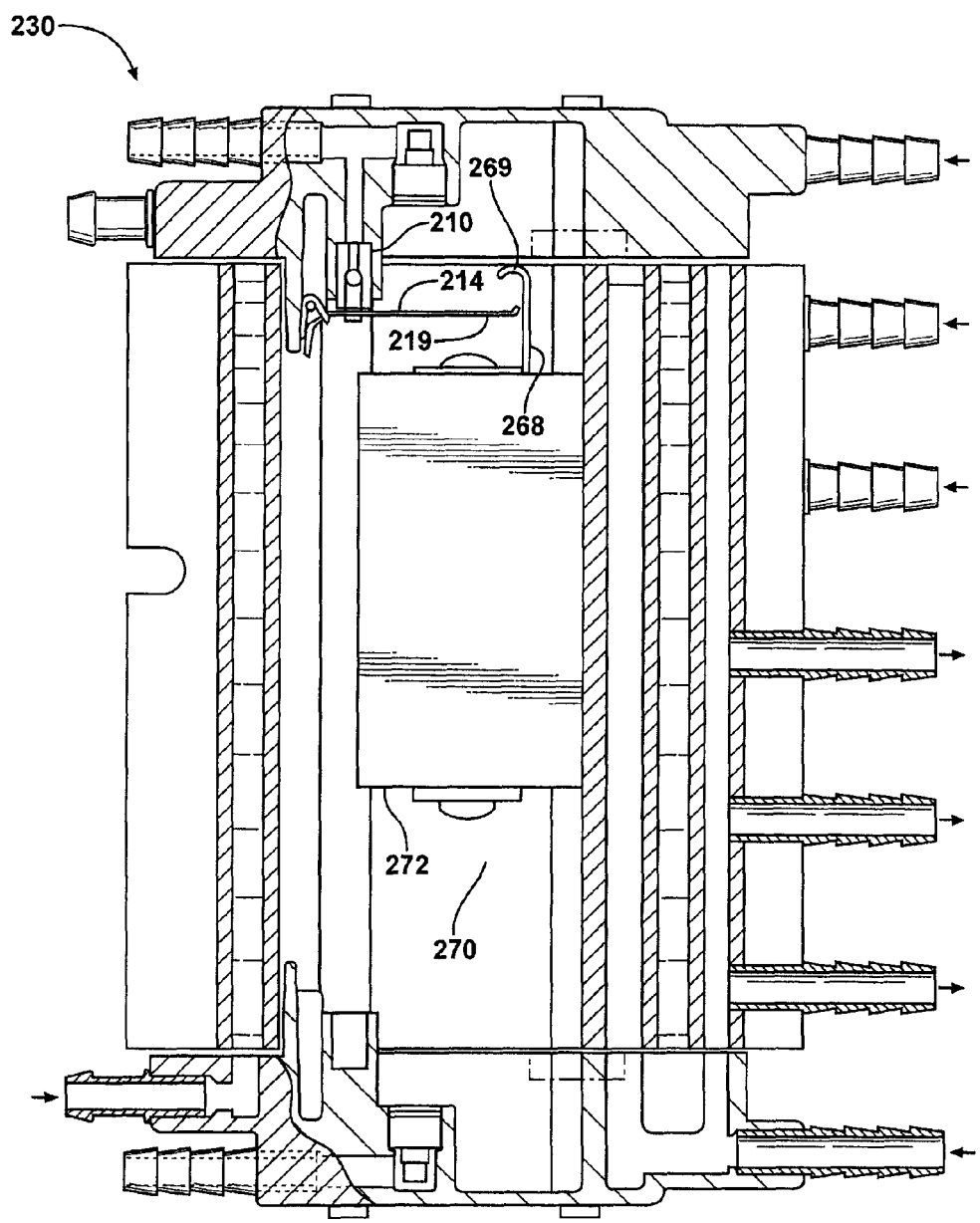
FIG. 2 shows a fuel vapor separator showing a closed biased vent valve in a closed position and the float in a disengaged position in accordance with the prior art.

An engine of the commonly runs on a liquid fuel like gasoline or ethanol. Liquid fuel is drawn from a fuel tank by the engine. A low pressure fuel supply pump draws fuel from the tank through the supply line. The fuel is delivered to a vapor separator, such as the one illustrated in prior art FIG. 2. The vapor separator collects and discharges vapors given off from the incoming low pressure fuel and also from the hot, agitated fuel returning from the engine. A high pressure pump then pumps the fuel under pressure into the fuel injector system to be consumed by the engine.

More specifically, the vapor separator collects and discharges vapors given off from the fuel. The vapor separator is defined by a housing which is sealed to contain both the liquid fuel and vapors given off by the fuel, and has a vapor vent to allow vapors to bleed off. In this case, the vapor separator is controlled by a decoupled float valve, which responds to the level of liquid fuel in the vapor separator. Whenever liquid fuel threatens to escape through the vapor vent, the float valve automatically closes. Otherwise, the vapor vent remains open to exhaust fuel vapors.

Figure 1:
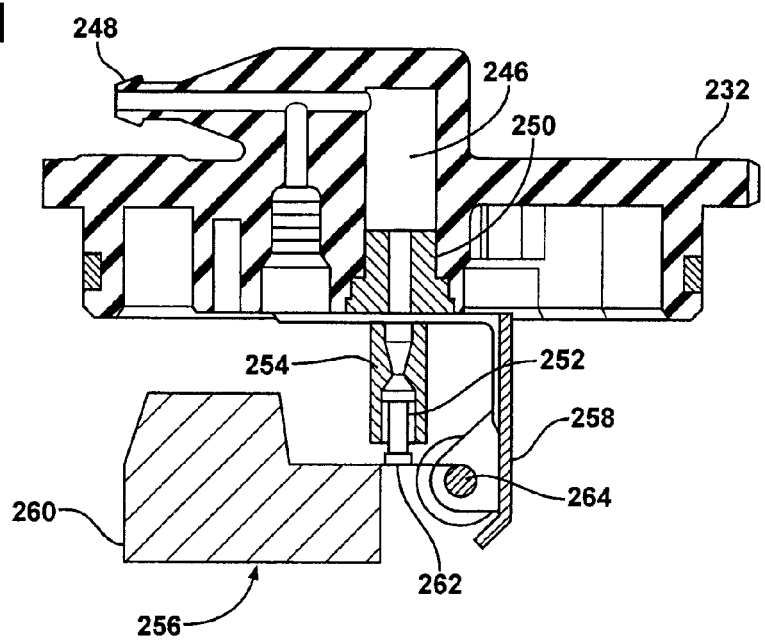
FIG. 1 shows a top wall assembly of a vapor separator in accordance with the prior art.
Figure 3:
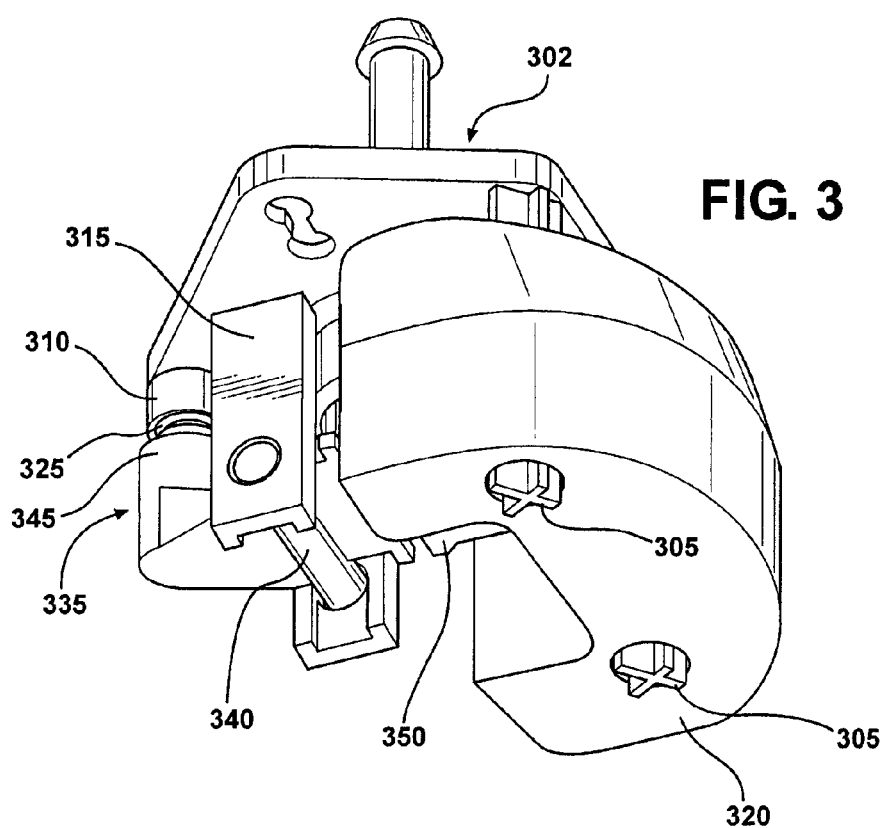
FIG. 3 shows a snap-assembly decoupled float vapor vent in accordance with another aspect of the invention.

FIG. 3 shows an exemplary snap-assembly 300 decoupled float vapor vent in accordance with the invention. The assembly 300 includes a hinge pin bracket 302, a float 320, a float bracket 335 and a locking member 340, together which operate to allow the float 320 to move up and down thereby opening and closing, respectively, the vent. The float 320, which can be made of a synthetic resin, is slidably attached to guide members and supported rotatably by a pair of supporting arms 305 on the hinge pin bracket 302.

Figure 4A:
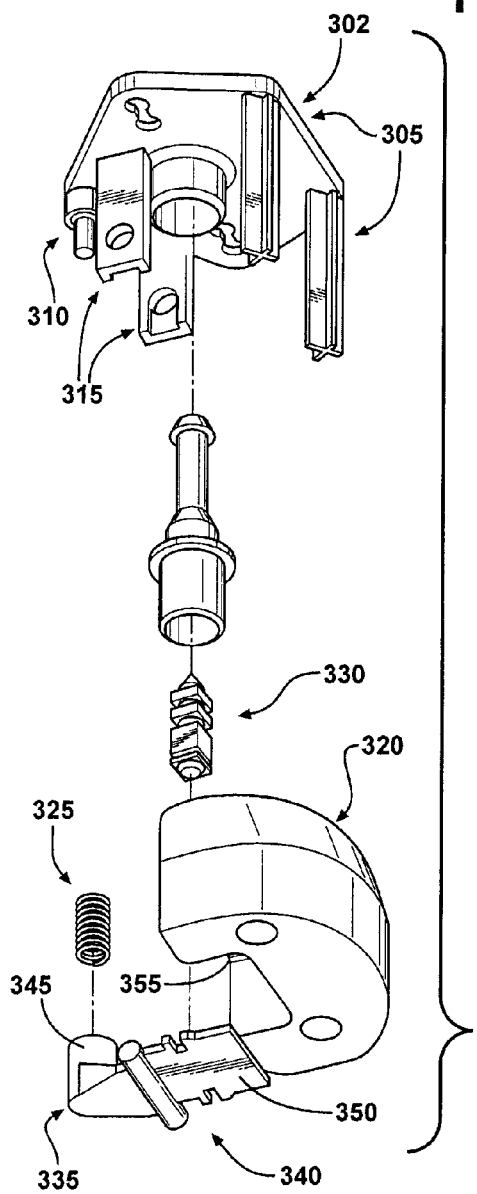
FIGS. 4A and 4B show an exploded view of the snap-assembly illustrated in FIG. 3.
Figure 4B:
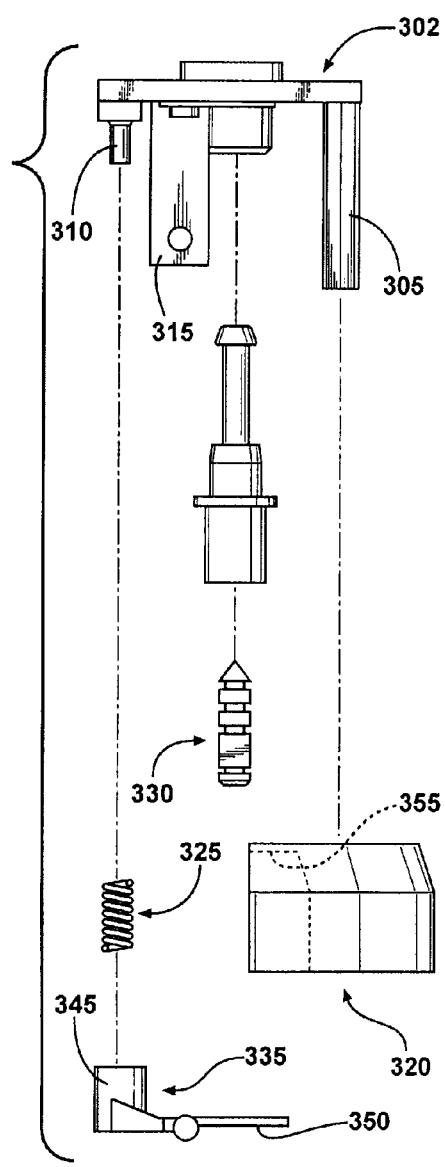

FIGS. 4A and 4B show an exploded view of the snap-assembly 300 illustrated in FIG. 3. The snap-assembly 300 is, in one exemplary embodiment, a decoupled float vapor vent assembly that includes a hinge pin bracket 302 with an elongate float guide member 305 adjacent one end, and a spring retention member 310 adjacent an opposite end with a through opening and a pair of laterally spaced support arms 315 having snap retention features between the ends. The assembly 300 also has a float 320 that is slidably disposed on the float guide member 305, and a spring 325 having opposite ends with one end being retained by the spring retention member 310 on the hinge pin bracket 302. Additionally, the assembly 300 has a valve needle 330 and a float bracket 335 having a spring retention member 345 adjacent one end configured to retain another end of the spring (opposite the end of the spring secured at spring retention member 310) and a float retention member 350 adjacent an opposite end configured to retain the float in an assembled state and to operably support the valve needle 330 for opening and closing the through passage. A locking member 340 extends transversely between the spring retention member 345 and the float retention member 350, the locking member 340 is configured for locked, snapping engagement with the snap retention features on the support arms 305 of the hinge pin bracket 302 to maintain the assembly in an assembled state.

Figure 5A:
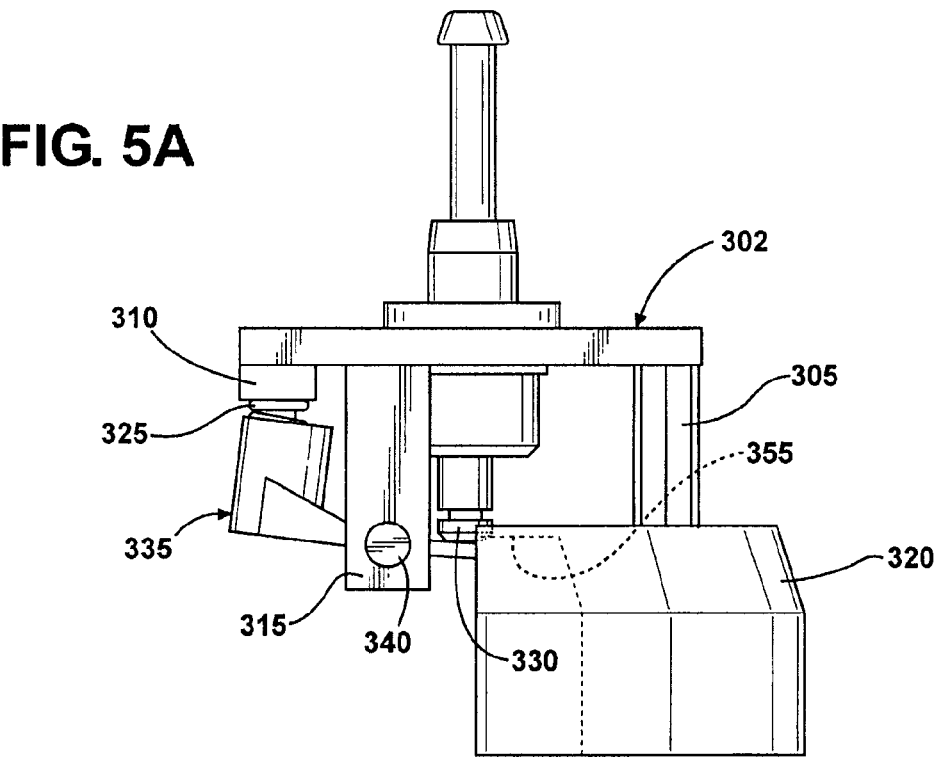
FIGS. 5A and 5B show a side view of the snap-assembly illustrated in FIG. 3 with the vent in an opened and closed position.
Figure 5B:
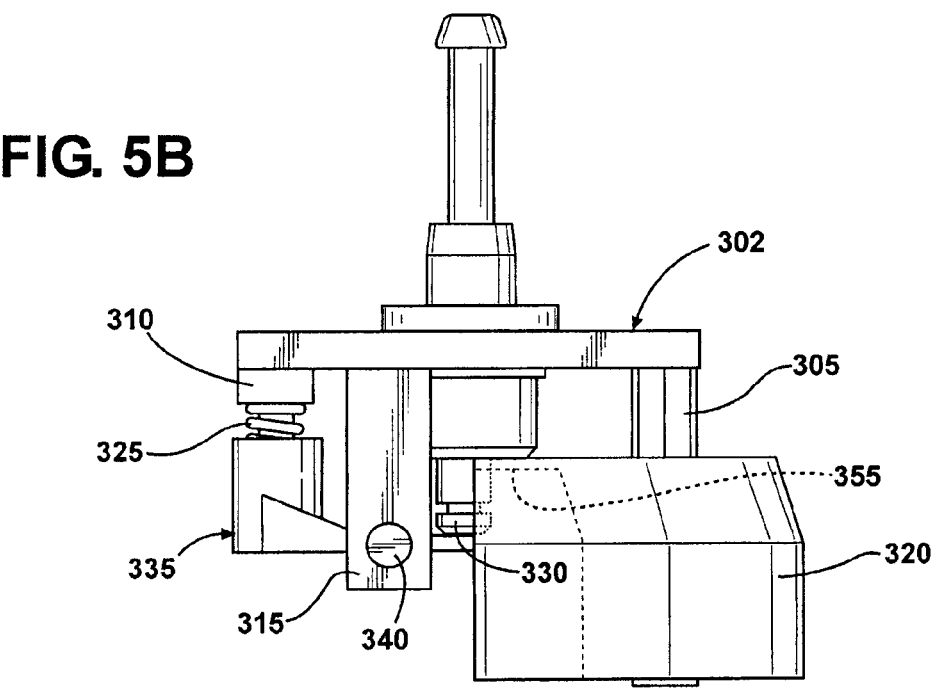

FIGS. 5A and 5B show a side view of the snap-assembly 300 illustrated in FIG. 3 with the vent in an opened position and a closed position respectively. When fluid level in the enclosed chamber becomes depleted due to the accumulation of vaporized fuel in the enclosed fuel chamber, the assembly 300 operates move the float 320 in the down position of FIG. 5A, in which the float 320 is coupled to the float retention member 350 and vaporized fuel is vented. On the other hand, when the fluid level is filled in the enclosed chamber, the assembly 300 operates to move the float 320 in the up position of FIG. 5B, in which the float 320 is decoupled from the float retention member 350 and the vent remains closed.

Obviously, many modifications and variations of the present invention are possible in light of the above teachings. It is, therefore, to be understood that within the scope of the appended claims, the invention may be practiced otherwise than as specifically described.

What is claimed is:

1. A vapor vent assembly, comprising:
   a hinge pin bracket with an elongate float guide member adjacent one end and a spring retention member adjacent an opposite end with a through opening and a pair of laterally spaced support arms having snap retention features between the ends;
   a float slidably disposed on the float guide member;
   a spring having opposite ends with one end being retained by the spring retention member on the hinge pin bracket;
   a valve needle; and
   a float bracket having a spring retention member adjacent one end configured to retain another end of the spring and a float retention member adjacent an opposite end configured to retain the float in an assembled state and to operably support the valve needle for opening and closing the through passage and having a locking member extending transversely between the spring retention member and the float retention member, the locking member being configured for locked, snapping engagement with the snap retention features on the hinge pin bracket to maintain the assembly in an assembled state.

2. The vapor vent assembly of claim 1, wherein, when fluid level in an enclosed fuel chamber becomes depleted due to accumulation of vaporized fuel in the enclosed fuel chamber, the assembly operates to move the float in a downward position such that the vaporized fuel vents.

3. The vapor vent assembly of claim 1, wherein, when fluid level is filled in an enclosed fuel chamber, the assembly operates to move the float in an upward position such that the vent remains closed.

4. The vapor vent assembly of claim 1 wherein the float retention member is detachably coupled to the float for disengaging from the float when the float is in an up position and for engaging the float when the float is in a down position.

5. The vapor vent assembly of claim 4 wherein the float is disposed in an enclosed chamber including fuel for moving between the up and down positions in response to the fluid level of the fuel in the enclosed chamber.

6. The vapor vent assembly of claim 5 wherein the through passage is opened to vent vaporized fuel when the float is in the down position and wherein the through passage is closed when the float is in the up position.

* * * * *